Figure 1:
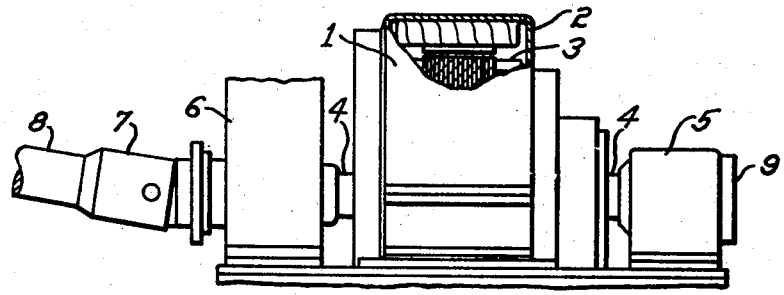

July 24, 1951      G. P. LESSMANN      2,561,987

THRUST BEARING DAMPER

Filed Dec. 27, 1947

INVENTOR
Gerhard P. Lessmann.

Patented July 24, 1951

2,561,987

UNITED STATES PATENT OFFICE 2,561,987

THRUST BEARING DAMPER

Gerhard P. Lessmann, Pittsburgh, Pa., assignor to Westinghouse Electric Corporation, East Pittsburgh, Pa., a corporation of Pennsylvania Application December 27, 1947, Serial No. 794,181

13 Claims. (Cl. 188—97)

This invention relates to apparatus for damping axial oscillations of a rotating shaft and, more particularly, to apparatus for damping the axial oscillations of the rotor shaft of an electric motor wherein the oscillations are caused by cyclical forces applied in an axial direction and introduced by the load or mechanism to which the electric motor is connected.

Large electric motors of the type commonly employed in steel mill rolling operations have their rotor shafts mounted in such manner that a small endwise movement of the rotor and rotor shaft is permitted. As is well known, an electric motor has a magnetic field which is normally operative to hold its rotor in a given axially centered position. Upon movement of the rotor out of its magnetically centered position, a magnetic force between the rotor and stator of the motor is developed and which is effective to return the rotor to its magnetically centered position. This magnetic force will vary with the axial displacement of the rotor. This magnetic force acts much in the same manner as though the rotor were centered by resilient springs, and the rotor has a natural period of vibration or oscillation similar to that encountered in any mechanical resilient mounting.

The pedestal bearing supports for the shafts carrying the rotor of an electric motor employed in steel mill operations are provided with heavy thrust bearings for preventing damage to the motor under unusual conditions. Such conditions arise, for example, upon failure of the connection of the motor to its load. Such failures may develop sufficient force, which without the emergency thrust bearing, would be effective to push the armature through its stator and thereby result in irreparable damage to the motor. The thrust bearings provided are emergency devices for the purpose of taking care of unusual conditions such as encountered in the example mentioned above. The resilient force produced by the magnetic field between the rotor and stator is effective under normal conditions to prevent axial movements of the rotor to an extent which would bring into play the thrust bearings provided for emergency conditions.

In some motor applications, the load to which the motor is connected subjects the motor shaft to periodic forces of a cyclical nature. One example of this condition is had where the power from the rotor shaft is taken off at an angle with respect to the shaft through a universal coupling. In such case, the frictional forces within the universal coupling subject the motor shaft to an axial thrust which occurs twice in every revolution of the motor shaft. Although considered individually, the value of such frictional force in an axial direction may be insufficient to cause noticeable movement of the rotor against the resilient force of its magnetic field, a more serious problem arises where the cyclical force applied in an axial direction with respect to the rotor is in phase with or a harmonic of the natural period of axial oscillation of the particular motor in question. In such cases, the axial movements of the rotor will build up to an extent that the emergency thrust bearings are brought into operation thereby producing a noticeable pounding action which may result in damage to the thrust bearings and possible damage to the motor itself.

One of the principal objects of this invention is to provide apparatus for damping the axial oscillations of the rotor shaft of an electric motor as caused by the application thereto in an axial direction of a force of a cyclical nature.

A further object of the invention is to provide a novel form of fluid operated device for damping the axial oscillations of a rotating shaft.

A still further object of the invention is to provide a fluid operated damping device in connection with emergency thrust bearings for a rotating shaft which will be effective to damp axial oscillations of the shaft caused by the application thereto of forces of a cyclical nature which would be otherwise effective to cause a pounding action on the thrust bearing.

Other objects and advantages of the invention will become apparent from the following description.

Figure 2:
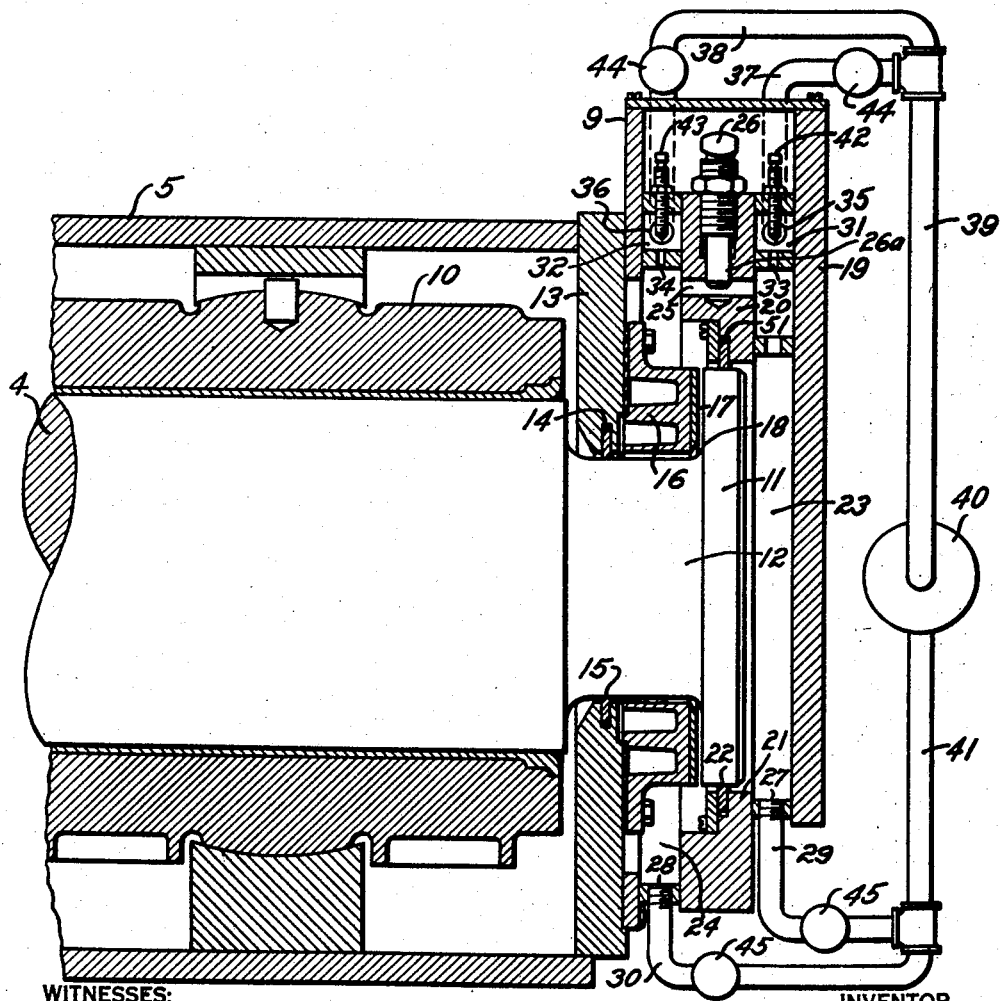

In the drawing, there is a preferred embodiment of the invention. In this showing:

Figure 1 is a partial view in side elevation of an electric motor illustrating its mounting and connection to a load; and Fig. 2 is a vertical sectional view of the damping device employed in connection with the apparatus shown in Figure 1.

Referring to Figure 1, the numeral 1 designates an electric motor having a stator frame 2 and a rotor 3, a portion of the stator frame 2 and rotor 3 being broken away and shown in section. The rotor 3 is carried by a rotor shaft 4 mounted in heavy pedestal-type bearings 5 and 6. The bearings 5 and 6 are provided with heavy emergency thrust bearings (not shown) in accordance with conventional practice. The portion of the shaft 4 extending beyond the bearing support 6 is illustrated as being connected by a universal coupling 7 to a spindle or jack shaft 8 which is provided with an operative connection (not shown) to a load, such as the rolls of a steel mill.

As pointed out above, a magnetic field exists between the stator frame 2 and rotor 3 of the electric motor 1 which is operative to center the rotor 3 with respect to the frame 2. This field provides a force which varies with the distance of the rotor 3 from its magnetic center and is effective to return the rotor 3 to a centered position whenever it is moved therefrom by the application to the shaft 4 of an axial force. The thrust bearings provided in connection with the pedestal bearing supports 5 and 6 are commonly provided with 1/8" to 3/16" of play, thereby permitting free axial movement of the rotor of from about 1/4" to 3/8". This axial movement of the rotor is opposed by no force other than the force of the magnetic field existing between the rotor 3 and its magnetic frame 2. This force, as pointed out above, is sufficient to prevent the play in the thrust bearings being taken up by the application to the rotor shaft of normal axial forces unless such forces are of a cyclical nature having a period in phase with or a harmonic of the natural oscillation period of the rotor 3. In the latter case, the axial oscillations of the rotor 4 will build up to the point where the thrust bearings are brought into play.

Referring to Figure 2, there is shown a sectional view of the pedestal bearing 5 and the fluid damping device 9 connected thereto. This showing illustrates the end of the shaft 4 journalled in a bearing 10 in accordance with conventional practice. A cylindrical head 11 of enlarged diameter is connected to the end of the shaft 4 by a necked-down portion 12 projecting through an opening in an annular plate 13 secured to the end of the housing for the bearing 5. The inner edge of the annular plate 13 defining the opening through which the necked-down portion 12 projects is provided with an annular slot 14 in which an annular ring 15 is mounted. The annular ring 15, at its inner edge, is in fluid sealing engagement with the surface of the necked-down portion 12, and its outer peripheral edge is spaced from the innermost edge of the slot 14 in order to permit radial movement thereof in response to radial movements of the shaft 4.

A thrust bearing 16 is secured to the annular plate 13 forming the end of the bearing housing 5. The thrust bearing 16 is provided with a bearing surface 17 which cooperates with the inner surface 18 of the enlarged head or piston 11 to absorb the thrust of the shaft 4 when the shaft 4 is moved to the left as viewed in Fig. 2 under an axial force. With the rotor 3 occupying a position corresponding to its magnetic center, the surface 18 will be positioned approximately 1/8" to 3/16" from the bearing surface 17. The provision of the thrust bearing 16 and the positioning of the bearing surface 17 with respect to the surface 18 corresponds to conventional practice.

A housing 19 is secured to the annular plate 13 and cooperates therewith to provide a cylinder for the piston 11. The housing 19 is provided with an annular portion 20 secured centrally thereof with its inner surface 21 arranged concentric with and adjacent the peripheral surface of the piston 11. An annular slot 51 is formed in the member 20 for the reception of an annular ring 22 having its inner edge in fluid sealing engagement with the peripheral edge of the piston 11. The annular ring 22 has an outer diameter of smaller size than the outer diameter of the slot 51 in order that the ring 22 may move radially of such slot to compensate for radial movement of the piston 11 without altering its fluid sealing engagement therewith.

The annular member 20, together with the annular ring 22 and piston 11, cooperate to divide the cylinder housing 19 into two compartments 23 and 24, the compartment 24 being an annular compartment. In order that axial movement of the piston 11 and thereby the shaft 4 may be permitted, a by-pass opening 25 is provided in the upper portion of the annular member 20 for interconnecting the compartments 23 and 24. Upon axial displacement of the shaft 4, fluid will be forced through the bypass opening 25 from one to the other of the compartments 23 or 24. Since the effective area of the bypass opening 25 is relatively small compared to the volume of fluid which will be displaced by the piston 11 upon axial displacement of the shaft 4, the flow of fluid through the opening 25 will be retarded to provide a force resisting axial displacement of the shaft 4. This retarding force may be varied by adjusting the position of a setscrew 26 having an end 26a extending into the bypass opening 25. Adjustment of the screw 26 will be effective to vary the effective size of the bypass opening 25, and thereby vary the retarding force on the fluid flowing between the compartments 23 and 24. The retarding force exerted in this manner will be effective to damp the oscillatory movements of the shaft 4 by reason of the application thereto of periodic forces in phase with or occurring as a harmonic of the natural period of oscillation of the shaft 4 and its rotor 3. This damping action will be effective to prevent such periodically applied forces from building up to a point where they are effective to move the surface 18 into engagement with the thrust bearing surface 17.

The lower ends of the compartments 23 and 24 are provided, respectively, with inlet openings 27 and 28 which are connected to fluid supply conduits 29 and 30. The upper ends of the compartments 23 and 24 are provided with small exhaust chambers 31 and 32 communicating with the chambers 23 and 24, respectively, through the openings 33 and 34. The compartments 31 and 32 are provided with exhaust openings 35 and 36, respectively, connected to exhaust conduits 37 and 38. The exhaust conduits 37 and 38 are connected with a main exhaust conduit 39 by which the fluid is returned to a pump 40. The pump 40 delivers fluid to the supply conduits 29 and 30 through a main supply conduit 41. The fluid employed is preferably light lubricating oil, although any other suitable form of incompressible fluid may be employed. This fluid is continuously circulated by the pump 40 through the compartments 23 and 24 by way of the supply conduits 29 and 30 and the exhaust conduits 37 and 38.

It will be understood that the showing of the fluid circulating system is diagrammatic and any other system for circulating an incompressible fluid through the chambers 23 and 24 may be employed.

It will be noted that the effective size of the exhaust openings 33 and 34 through which fluid is continuously circulated for the purpose of preventing the formation of air pockets in the chambers 23 and 24 is comparatively small with respect to the effective area of the bypass opening 25. By making the area of the openings 33 and 34 small as compared to the area of the bypass opening 25, most of the fluid will be forced through the bypass opening 25 upon displacement thereof by axial movement of the rotor shaft 4. In order to further limit the flow of fluid through the chambers 31 and 32 upon axial displacement of the shaft 4, setscrews 42 and 43 are provided in connection with the openings 33 and 34 for the purpose of adjustably varying the flow of fluid through these openings. If desired, check valves may be provided in the circulating system at 44 and should be provided at 45 to prevent excessive amounts of fluid from being forced into the system upon axial displacement of the shaft 4. The check valves at 45 are necessary to prevent fluid from being bypassed from one side of the piston to the other and thereby interfering with the damping action.

From the foregoing, it will be apparent that the housing 19 and associated parts cooperate with the piston 11 to provide an effective hydraulic or fluid damping device for damping axial oscillations of the rotor shaft 4. In this manner, engagement of the thrust bearing 17 is effectively prevented at all times except under the emergency conditions for which the thrust bearing is designed. It will further be apparent that the damping force provided may be readily varied, by adjustment of the set screw 26. In this manner, the proper damping force may be applied in accordance with the periodic frequency of the force applied to the rotor shaft 4.

Since certain changes may be made in the above-described construction and different embodiments of the invention may be made without departing from the spirit and scope thereof, it is intended that all the matter contained in the above description and shown in the accompanying drawing shall be considered as illustrative and not in a limiting sense.

I claim as my invention:

1. Apparatus for damping the axial oscillations of a rotating shaft due to cyclical axial forces applied thereto in use, comprising in combination, a piston rigidly connected to the end of said shaft and thus rotating therewith, a cylinder housing for said piston, said housing being provided with an annular slot, and an annular ring receivable in said slot with its inner edge in fluid sealing engagement with the outer surface of said piston, the outer diameter of said ring being less than the outer diameter of said slot so that said ring may move radially in said slot with small radial movements of said piston, said ring and piston cooperating to divide said housing into two fluid chambers on opposite sides of said piston, said housing having a bypass opening in its wall interconnecting said chambers and through which opening fluid may be conducted from one chamber to the other in response to axial oscillations of said piston by said shaft, said bypass opening being limited in size so that the transfer of fluid between said chambers will be retarded to thereby exert a damping effect on the axial oscillations of said shaft.

2. Apparatus for damping the axial oscillations of a rotating shaft due to cyclical axial forces applied thereto in use, comprising in combination, a piston rigidly connected to the end of said shaft and rotating therewith, a cylinder housing for said piston, said housing being provided with an annular slot, and an annular ring receivable in said slot with its inner edge in fluid sealing engagement with the outer surface of said piston, the outer diameter of said ring being less than the outer diameter of said slot so that said ring may move radially in said slot with small radial movements of said piston, said ring and piston cooperating to divide said housing into two fluid chambers on opposite sides of said piston, said housing having a bypass opening in its wall interconnecting said chambers and through which opening fluid may be conducted from one chamber to the other in response to axial oscillations of said piston by said shaft, said bypass opening being limited in size so that the transfer of fluid between said chambers will be retarded to thereby exert a damping effect on the axial oscillations of said shaft, and an adjustable element extending into said bypass opening for varying the effective size thereof and the damping effect on said shaft.

3. Apparatus for damping the axial oscillations of a rotating shaft due to cyclical axial forces applied thereto in use, comprising in combination, a piston rigidly connected to the end of said shaft and rotating therewith, a cylinder housing for said piston, said housing being provided with an annular slot, and an annular ring receivable in said slot with its inner edge in fluid sealing engagement with the outer surface of said piston, the outer diameter of said ring being less than the outer diameter of said slot so that said ring may move radially in said slot with small radial movements of said piston, said ring and piston cooperating to divide said housing into two fluid chambers on opposite sides of said piston, said housing having a bypass opening in the housing wall interconnecting said chambers and through which opening fluid may be conducted from one chamber to the other in response to axial oscillations of said piston by said shaft, said bypass opening being limited in size so that the transfer of fluid between said chambers will be retarded to thereby exert a damping effect on the axial oscillations of said shaft, each of said fluid chambers having an inlet opening at the bottom thereof and an exhaust opening at the top thereof through which fluid may be continuously circulated to prevent the formation of air pockets therein.

4. Apparatus for damping the axial oscillations of a rotating shaft due to cyclical axial forces applied thereto in use, comprising in combination, a piston rigidly connected to the end of said shaft and rotating therewith, a cylinder housing for said piston, said housing being provided with an annular slot, and an annular ring receivable in said slot with its inner edge in fluid sealing engagement with the outer surface of said piston, the outer diameter of said ring being less than the outer diameter of said slot so that said ring may move radially in said slot with small radial movements of said piston, said ring and piston cooperating to divide said housing into two fluid chambers on opposite sides of said piston, said housing having a bypass opening in its wall for interconnecting said chambers and through which opening fluid may be conducted from one chamber to the other in response to axial oscillations of said piston by said shaft, said bypass opening being limited in size so that the transfer of fluid between said chambers will be retarded to thereby exert a damping effect on the axial oscillations of said shaft, each of said fluid chambers having an inlet opening at the bottom thereof and an exhaust opening at the top thereof through which fluid may be continuously circulated to prevent the formation of air pockets therein, said exhaust openings having devices therein for limiting the flow of fluid therethrough to prevent such openings from interfering with the damping effect on said shaft by the retarded flow of fluid through said bypass opening.

5. A device for damping the axial oscillations of a rotating shaft, comprising in combination, a piston rigidly connected to the end of said rotating shaft, a cylinder housing having fluid sealing parts engageable with said piston and the shaft to provide fluid tight chambers on opposite sides of said piston, said housing having a bypass opening in its wall interconnecting said chambers and through which fluid may be conducted from one of said chambers to the other upon axial movement of said piston by axial oscillations of said shaft, an adjustable device in said bypass opening for varying the effective size of its opening to thereby retard the flow of fluid therethrough and exert a damping effect on the axial oscillations of said shaft, and a thrust bearing positioned in the housing and engageable with said piston for limiting the axial movement of said shaft with respect to said housing.

6. A device for damping the axial oscillations of a rotating shaft, comprising in combination, a piston rigidly secured by means of a relatively thick shaft extension to the end of the shaft, a housing for the piston having parts engageable with the piston and thick shaft extension to provide a fluid chamber on each side of the piston, said housing having in its wall a bypass opening through which fluid may be conducted from one chamber to the other upon axial movement of the shaft, means for adjusting the size of the bypass opening to thus alter the damping effect on the axial movements of the shaft, each of said chambers is, at the bottom thereof, provided with an inlet opening, means for continuously supplying the chambers with an oil under pressure through said inlet openings, each of said fluid chambers is, at the top thereof, provided with an outlet opening having a sectional area less than the bypass opening.

7. A device for damping the axial oscillations of a rotating shaft, comprising in combination, a piston rigidly secured by means of a relatively thick shaft extension to the end of the shaft, a housing for the piston having parts engageable with the piston and thick shaft extension to provide a fluid chamber on each side of the piston, said housing having in its wall a bypass opening through which fluid may be conducted from one chamber to the other upon axial movement of the shaft, means for adjusting the size of the bypass opening to thus alter the damping effect on the axial movements of the shaft, each of said chambers is, at the bottom thereof, provided with an inlet opening, each of said fluid chambers is, at the top thereof, provided with an outlet opening having a sectional area less than the bypass opening, and means in each of said outlet openings for varying the sectional area thereof.

8. A device for damping the axial oscillations of a rotating shaft, comprising in combination, a piston rigidly secured by means of a relatively thick shaft extension to the end of the shaft, a housing for the piston having parts engageable with the piston and thick shaft extension to provide a fluid chamber on each side of the piston, said housing having in its wall a bypass opening through which fluid may be conducted from one chamber to the other upon axial movement of the shaft, means for adjusting the size of the bypass opening to thus alter the damping effect on the axial movements of the shaft, each of said chambers is, at the bottom thereof, provided with an inlet opening, each of said fluid chambers is, at the top thereof, provided with an outlet opening having a sectional area less than the bypass opening, and means operatively associated with said inlet openings for preventing oil flow out of said inlet openings.

9. A device for damping the axial oscillations of a rotating shaft, comprising in combination, a piston rigidly secured by means of a relatively thick shaft extension to the end of the shaft, a housing for the piston having parts engageable with the piston and thick shaft extension to provide a fluid chamber on each side of the piston, said housing having in its wall a bypass opening through which fluid may be conducted from one chamber to the other upon axial movement of the shaft, means for adjusting the size of the bypass opening to thus alter the damping effect on the axial movements of the shaft, each of said chambers is, at the bottom thereof, provided with an inlet opening, means for continuously supplying the chambers with an oil under pressure through said inlet openings, each of said fluid chambers is, at the top thereof, provided with an outlet opening having a sectional area less than the bypass opening, means in each of said outlet openings for varying the sectional area thereof, and means operatively associated with said inlet openings for preventing oil flow out of said inlet openings.

10. A device for damping the axial oscillations of a rotating shaft, comprising in combination, a piston rigidly secured by means of a relatively thick shaft extension to the end of the shaft, a housing for the piston having parts engageable with the piston and thick shaft extension to provide a fluid chamber on each side of the piston, said housing having in its wall a bypass opening through which fluid may be conducted from one chamber to the other upon axial movement of the shaft, means for adjusting the size of the bypass opening to thus alter the damping effect on the axial movements of the shaft, each of said chambers is, at the bottom thereof, provided with an inlet opening, means for continuously supplying the chambers with an oil under pressure through said inlet openings, each of said fluid chambers is, at the top thereof, provided with an outlet opening having a sectional area less than the bypass opening, means in each of said outlet openings for varying the sectional area thereof, means operatively associated with said inlet openings for preventing oil flow out of said inlet openings, and a thrust bearing surface for engaging the radial surface of said piston upon movement of said piston over a greater than normal range of axial oscillation of the shaft.

11. A device for damping the axial oscillations of a rotating shaft, comprising in combination, a piston rigidly secured by means of a relatively thick shaft extension to the end of the shaft, a housing for the piston having parts engageable with the piston and thick shaft extension to provide a fluid chamber on each side of the piston, said housing having in its wall a bypass opening through which fluid may be conducted from one chamber to the other upon axial movement of the shaft, means for adjusting the size of the bypass opening to thus alter the damping effect on the axial movements of the shaft, each of said chambers is, at the bottom thereof, provided with an inlet opening, means for continuously supplying the chambers with an oil under pressure through said inlet openings, each of said fluid chambers is, at the top thereof, provided with an outlet opening having a sectional area less than the bypass opening, and means operatively associated with said inlet openings for preventing oil flow out of said inlet openings.

12. A device for damping the axial oscillations of a rotating shaft, comprising in combination, a piston rigidly secured by means of a relatively thick shaft extension to the end of the shaft, a housing for the piston having parts engageable with the piston and thick shaft extension to provide a fluid chamber on each side of the piston, said housing having in its wall a bypass opening through which fluid may be conducted from one chamber to the other upon axial movement of the shaft, means for adjusting the size of the bypass opening to thus alter the damping effect on the axial movements of the shaft, each of said chambers is, at the bottom thereof, provided with an inlet opening, means for continuously supplying the chambers with an oil under pressure through said inlet openings, each of said fluid chambers is, at the top thereof, provided with an outlet opening having a sectional area less than the bypass opening, and a thrust bearing surface for engaging the radial surface of said piston upon movement of said piston over a greater than normal range of axial oscillation of the shaft.

13. A device for damping the axial oscillations of a rotating shaft, comprising in combination, a piston rigidly secured by means of a relatively thick shaft extension to the end of the shaft, a housing for the piston having parts engageable with the piston and thick shaft extension to provide a fluid chamber on each side of the piston, said housing having in its wall a bypass opening through which fluid may be conducted from one chamber to the other upon axial movement of the shaft, means for adjusting the size of the bypass opening to thus alter the damping effect on the axial movements of the shaft, each of said chambers is, at the bottom thereof, provided with an inlet opening, means for continuously supplying the chambers with an oil under pressure through said inlet openings, each of said fluid chambers is, at the top thereof, provided with an outlet opening having a sectional area less than the bypass opening, means in each of said outlet openings for varying the sectional area thereof, and a thrust bearing surface for engaging the radial surface of said piston upon movement of said piston over a greater than normal range of axial oscillation of the shaft.

GERHARD P. LESSMANN.

REFERENCES CITED

The following references are of record in the file of this patent:

UNITED STATES PATENTS

| Number | Name | Date |
|---|---|---|
| 758,020 | Robinson | Apr. 19, 1904 |
| 1,129,409 | Ljungstrom | Feb. 23, 1915 |
| 1,386,879 | Ljungstrom | Aug. 9, 1921 |
| 1,421,785 | Junggren | July 4, 1922 |
| 2,395,888 | Lewis | Mar. 5, 1946 |